(12) United States Patent
Simone

(10) Patent No.: US 12,521,787 B2
(45) Date of Patent: Jan. 13, 2026

(54) SELF-PIERCING CLINCH FASTENER INSTALLATION PRESS

(71) Applicant: Doben Limited, Windsor (CA)

(72) Inventor: David M. Simone, Amherstburg (CA)

(73) Assignee: DOBEN LIMITED, Windsor (CA)

( * ) Notice: Subject to any disclaimer, the term of this patent is extended or adjusted under 35 U.S.C. 154(b) by 0 days.

(21) Appl. No.: 18/727,410

(22) PCT Filed: Oct. 4, 2023

(86) PCT No.: PCT/CA2023/051312
§ 371 (c)(1),
(2) Date: Jul. 9, 2024

(87) PCT Pub. No.: WO2024/103147
PCT Pub. Date: May 23, 2024

(65) Prior Publication Data
US 2025/0083215 A1    Mar. 13, 2025

Related U.S. Application Data

(60) Provisional application No. 63/425,447, filed on Nov. 15, 2022.

(51) Int. Cl.
*B21J 15/28*    (2006.01)
*B23P 19/00*    (2006.01)
*F16B 37/06*    (2006.01)

(52) U.S. Cl.
CPC .............. *B21J 15/28* (2013.01); *F16B 37/06* (2013.01); *B23P 19/006* (2013.01)

(58) Field of Classification Search
CPC ....... B23P 19/08; B23P 19/001; B23P 19/006; B23P 19/06; B21J 15/28; F16B 37/04; F16B 37/06
See application file for complete search history.

(56) References Cited

U.S. PATENT DOCUMENTS

| | | |
|---|---|---|
| 2,652,942 A | 9/1953 | Muchy |
| 2,749,606 A | 6/1956 | Donahue |

(Continued)

FOREIGN PATENT DOCUMENTS

EP    1606076 B1    2/2010

OTHER PUBLICATIONS

International Search Report and Written Opinion for International Application No. PCT/CA2023/051312 mailed Jan. 9, 2024.

(Continued)

*Primary Examiner* — Christopher J. Besler

(74) *Attorney, Agent, or Firm* — Carlson, Gaskey & Olds, P.C.

(57) ABSTRACT

A fastener clinching press includes a frame that supports a die having a hole that cooperates with the fastener to produce a slug from the workpiece. A ram has a head assembly that engages the fastener. A first sensor determines a ram position relative to the die. A pin is slidably supported within the head assembly and extends out of the head assembly to a tip that locates a fastener relative to the die. The pin is movable between multiple pin positions including a slug-eject position. A second sensor is arranged in the head assembly and is operatively connected to the pin. The sensor monitors the multiple pin positions that relate to a pin travel distance signature. A controller is in communication with the first and second sensors and determines an outcome of the clinching operation based upon the ram position and the pin travel distance signature.

11 Claims, 12 Drawing Sheets

(56) References Cited

U.S. PATENT DOCUMENTS

| | | | |
|---|---|---|---|
| 3,108,368 A * | 10/1963 | Steward | B23P 19/062 |
| | | | 29/520 |
| 3,253,631 A | 5/1966 | Reusser | |
| 4,610,072 A | 9/1986 | Muller | |
| 4,676,421 A | 6/1987 | Swanstrom | |
| 5,086,965 A | 2/1992 | Marsteller et al. | |
| 6,067,696 A | 5/2000 | Cecil et al. | |
| 6,254,332 B1 | 7/2001 | Miura et al. | |
| 6,276,050 B1 | 8/2001 | Mauer et al. | |
| 6,502,008 B2 | 12/2002 | Maurer et al. | |
| 10,220,467 B2 | 3/2019 | Iwamoto et al. | |
| 2004/0181937 A1 | 9/2004 | Woods | |
| 2007/0274804 A1 * | 11/2007 | Woods | B23P 19/062 |
| | | | 411/179 |
| 2013/0227832 A1 * | 9/2013 | Doo | B21J 15/28 |
| | | | 29/700 |
| 2016/0368106 A1 | 12/2016 | Koscielski et al. | |
| 2017/0239747 A1 | 8/2017 | Koscielski et al. | |
| 2021/0023607 A1 * | 1/2021 | Chan | B21J 15/285 |

OTHER PUBLICATIONS

RB&W Corporation, Global SPAC Technology brochure.

* cited by examiner

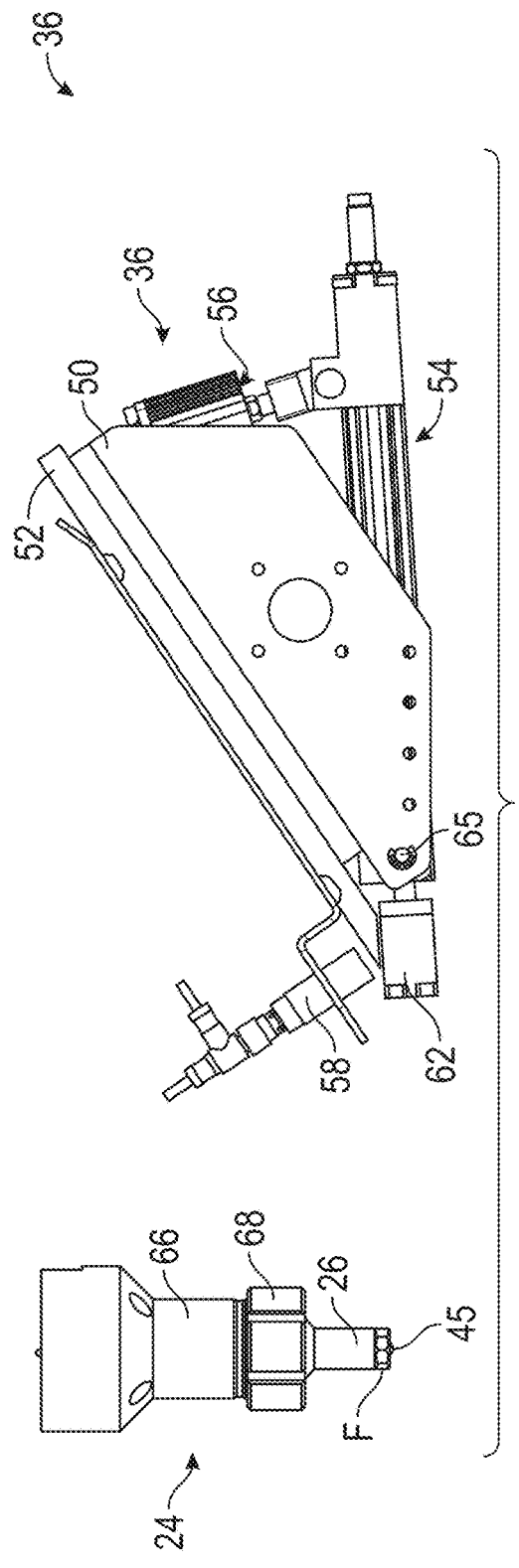
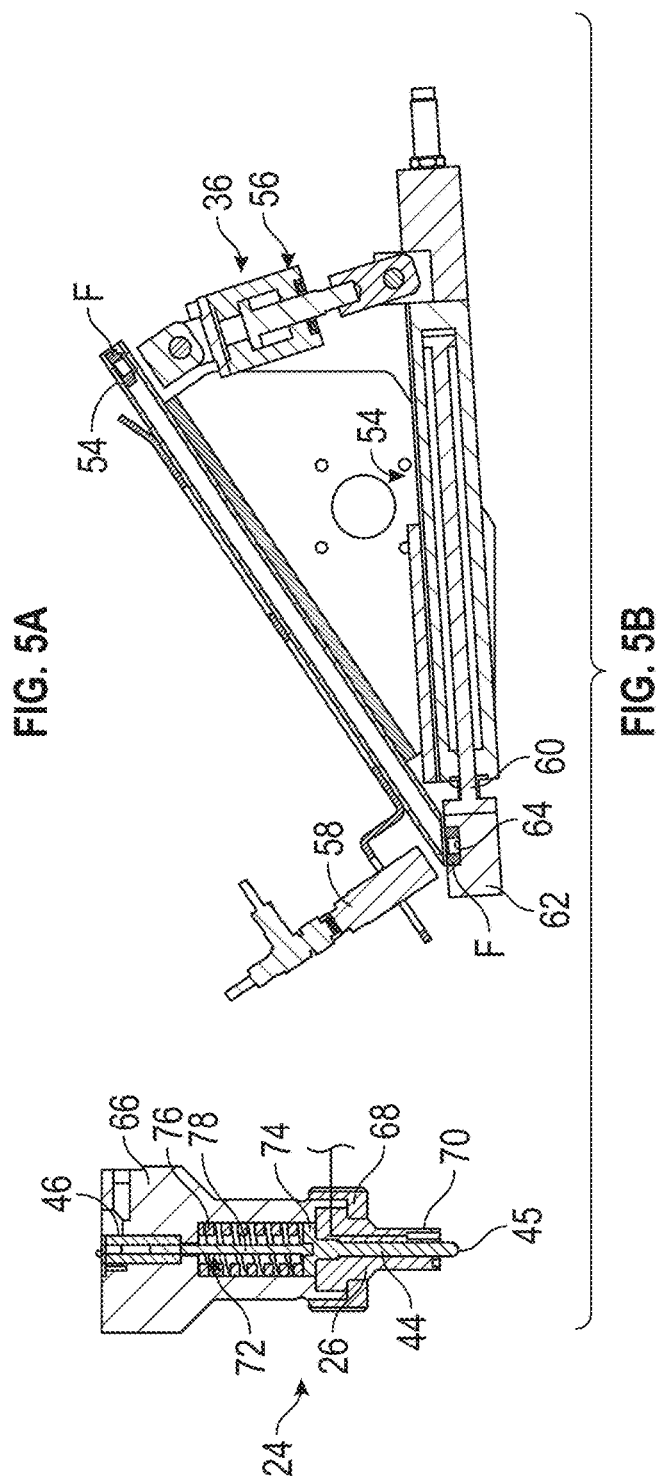
FIG. 5A
FIG. 5B

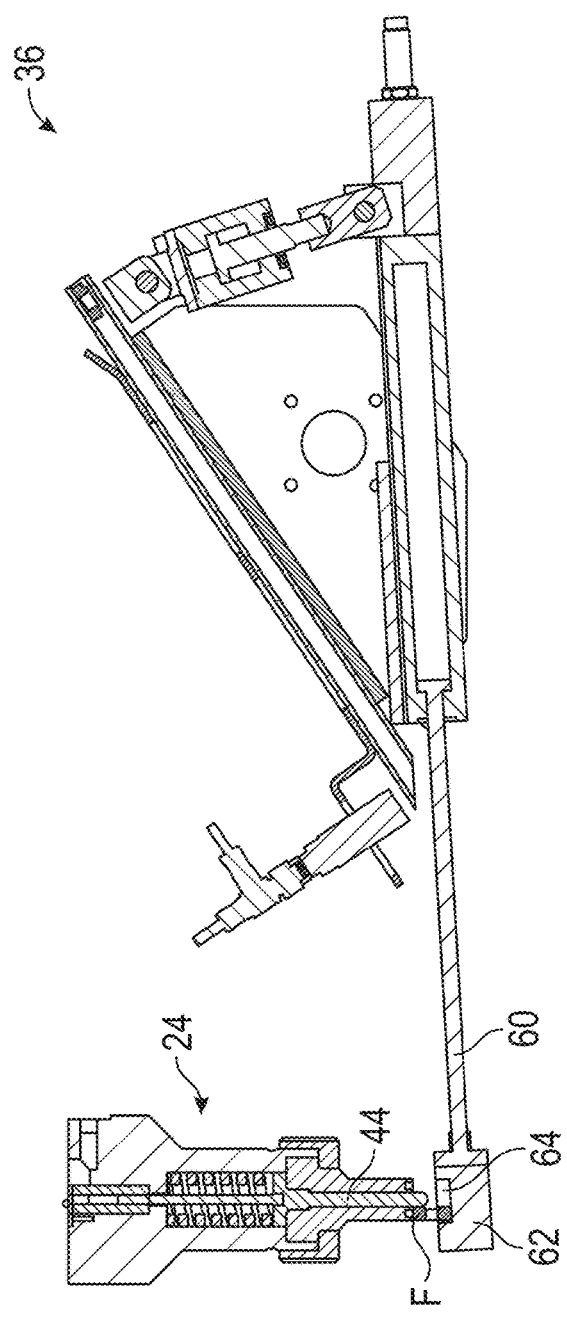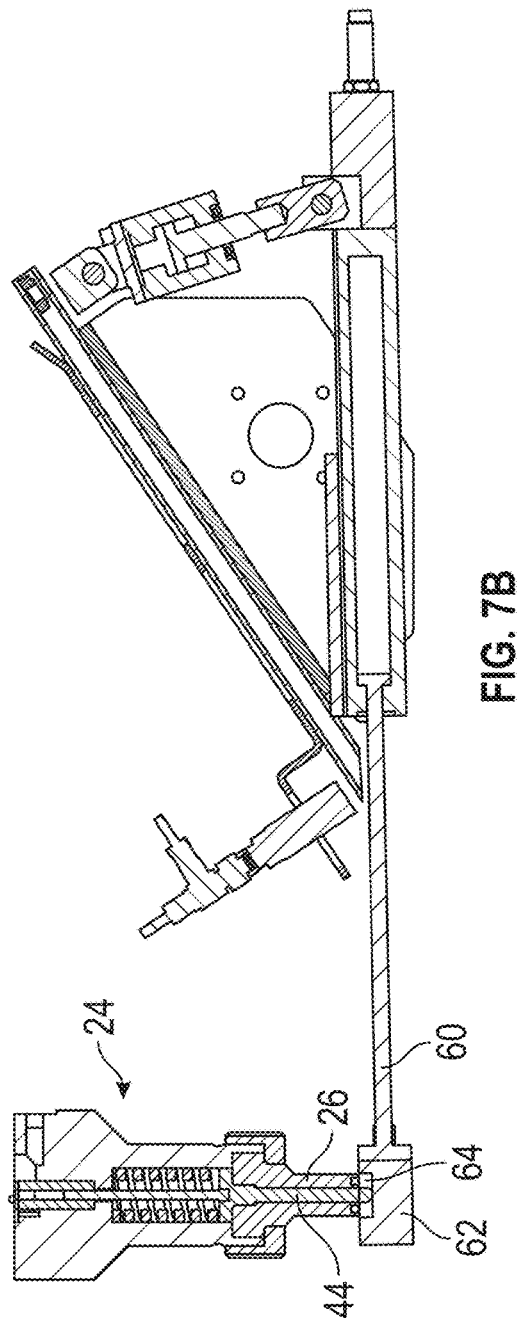
FIG. 7A
FIG. 7B

SELF-PIERCING CLINCH FASTENER INSTALLATION PRESS

CROSS-REFERENCE TO RELATED APPLICATION

This application claims priority to U.S. Provisional Application No. 63/425,447 filed on Nov. 15, 2022.

TECHNICAL FIELD

This disclosure relates to a clinching press for securing a fastener (e.g., nut) to a workpiece, such as sheet metal. More particularly, this disclosure relates to a head assembly for pressing the fastener while sensing fastener position and a feeder for loading the fastener onto the head assembly.

BACKGROUND

Clinching presses are used to secure clinch fasteners to metallic objects such as body panels for vehicles. A fastener, such as a nut, is loaded onto a head assembly. The head assembly moves to press a fastener against the panel until the panel engages a die with pressure sufficient to cause the fastener to pierce the panel and mechanically interlock with it.

Fastener loading onto the head assembly of the clinching presses is typically an automated process to minimize the fastener loading time, improve process reliability, and reduce pinch point hazards. Occasionally, the fastener is not properly loaded into the head assembly or the fastener may not be loaded into the head assembly at all. When an operator is manipulating a panel into position for fastener installation, the operator may visually identify fault conditions before or after the clinching press has performed the installation cycle.

Sensors have been used in an effort to determine the presence and orientation of the fastener in the clinching press. Additional switches or sensors have been used to detect the ram position to ensure the clinching press is closed. Typically, a linear variable displacement transducer (LVDT) has been connected to an exterior of a ram that carries the head assembly to measure the movement of the head assembly. If no nut is present, then the head assembly will move a greater amount than if a fastener is present and in the proper orientation. If the fastener is not in the proper orientation, then the head assembly will move slightly less than if the fastener is in the proper orientation. In this manner, fastener presence and orientation has been detected. However, it has been difficult to accurately detect the proper orientation of the fastener, especially as automation speeds have increased.

SUMMARY OF THE INVENTION

In one exemplary embodiment, a clinching press for performing a clinching operation to secure a fastener to a workpiece, the fastener clinching press includes a frame that supports a die having a hole that is configured to cooperate with the fastener to produce a slug from the workpiece. A ram has a head assembly that is configured to engage the fastener. A first sensor is configured to determine a ram position relative to the die. A pin is slidably supported within the head assembly and extends out of the head assembly to a tip that is configured to locate a fastener relative to the die, the pin is movable between multiple pin positions including a slug-eject position. A second sensor is arranged in the head assembly and is operatively connected to the pin, the sensor is configured to monitor the multiple pin positions that relate to a pin travel distance signature. A controller is in communication with the first and second sensors, the controller is configured to determine an outcome of the clinching operation based upon the ram position and the pin travel distance signature.

In a further embodiment of any of the above, the head assembly includes a cavity, and the pin is slidably movable within the cavity and includes a stop. A spring is arranged in the cavity and cooperates with the stop to bias the pin to a fully extended position.

In a further embodiment of any of the above, the ram includes a cylinder, the head assembly includes a head with a bore that slidably receives the pin, and a body that is operatively mounted to the cylinder. The head is operatively secured to the body to enclose the cavity.

In a further embodiment of any of the above, the second sensor is a linear variable displacement transducer that has a core that is secured to the stop for determination of pin movement therewith.

In a further embodiment of any of the above, the head assembly includes a magnet that is configured to maintain the fastener in engagement with the head assembly during the clinching operation.

In a further embodiment of any of the above, the clinching press includes a fastener feeder that has a shuttle with an end that is configured to receive a fastener. The shuttle is mounted to a shuttle cylinder that is configured to move the shuttle between a shuttle extended position and a shuttle retracted position. A lift cylinder is configured to pivot the shuttle cylinder between a first position that is configured to arrange the fastener in spaced relation to the head assembly and a second position that is configured to arrange the fastener in engagement with the head assembly.

In a further embodiment of any of the above, the first sensor is a switch.

In a further embodiment of any of the above, the clinching press includes a fastener proximity sensor that is arranged in the head assembly at a face of the head assembly that is configured to support the fastener during the clinching operation.

In a further embodiment of any of the above, the clinching press includes a slug discharge sensor that is in communication with the hole. The slug discharge sensor is in communication with the controller. The controller is configured to detect a passage of the slug with the slug discharge sensor.

In a further embodiment of any of the above, the assembly cell includes a multi-axis robot that is configured to transfer the workpiece to and from the clinching press for the clinching operation.

In a further embodiment of any of the above, the assembly cell includes a conveyor that is configured to feed the workpiece to the multi-axis robot.

In another exemplary embodiment, a clinching press for performing a clinching operation to secure a fastener to a workpiece, the fastener clinching press includes a frame, a ram that is movable relative to the frame and has a head assembly configured to engage the fastener, and a fastener feeder that has a shuttle with an end configured to receive a fastener. The shuttle is mounted to a shuttle cylinder that is configured to move the shuttle between a shuttle retracted position and a shuttle extended position in which the fastener is arranged beneath the head assembly. A lift cylinder is configured to pivot the shuttle in the extended position between a first position that is configured to arrange the fastener in spaced relation to the head assembly and a second position that is configured to arrange the fastener in engagement with the head assembly.

In a further embodiment of any of the above, the clinching press includes a pin that is slidably supported within the head assembly and extends out of the head assembly to a tip that is configured to locate a fastener. The pin is movable between multiple pin positions. A sensor is arranged in the head assembly and is operatively connected to the pin. The sensor is configured to monitor the multiple pin positions. A controller is in communication with the sensor. The controller is configured to determine an outcome of the clinching operation based upon the multiple pin positions.

In a further embodiment of any of the above, the shuttle includes an end with a pocket that is configured to receive the fastener from a chute. A fastener proximity sensor is mounted on the fastener feeder and is configured to detect a presence of the fastener in the pocket.

In a further embodiment of any of the above, the head assembly includes a magnet that is configured to maintain the fastener in engagement with the head assembly subsequent to the shuttle moving from the second position back to the first position.

In a further embodiment of any of the above, the clinching press includes a fastener proximity sensor that is arranged in the head assembly at a face of the head assembly that is configured to support the fastener with the shuttle returned to the second position.

In another exemplary embodiment, a method of clinching a fastener onto a workpiece includes positioning a fastener beneath a head assembly, magnetically supporting the fastener on the head assembly with a pin that extends into and in engagement with the fastener, advancing the head assembly toward a die, engaging a workpiece between the die and the head assembly to pierce the workpiece with the fastener during a clinching operation, and measuring movement of the pin with a sensor that is located within the head assembly to monitor the clinching operation.

In a further embodiment of any of the above, the sensor is a pin sensor, and includes a step of sensing a position of the head assembly with a ram sensor during the advancing step.

In a further embodiment of any of the above, the positioning step includes pivoting a shuttle toward the head assembly, which initiates the magnetically supporting step.

In a further embodiment of any of the above, the method includes a step of sensing a presence of the fastener on the head assembly with a proximity sensor within the head assembly during the magnetically supporting step.

BRIEF DESCRIPTION OF THE DRAWINGS

The disclosure can be further understood by reference to the following detailed description when considered in connection with the accompanying drawings wherein:

FIGS. 5A and 5B are respectively side views and cross-sectional views of the head assembly and feeder.

FIGS. 7A and 7B respectively illustrate misloaded and no-load fastener conditions.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

The disclosed system provides low-cost automation to clinch fasteners to sheet metal stampings or other materials at high speeds.

Figure 1:
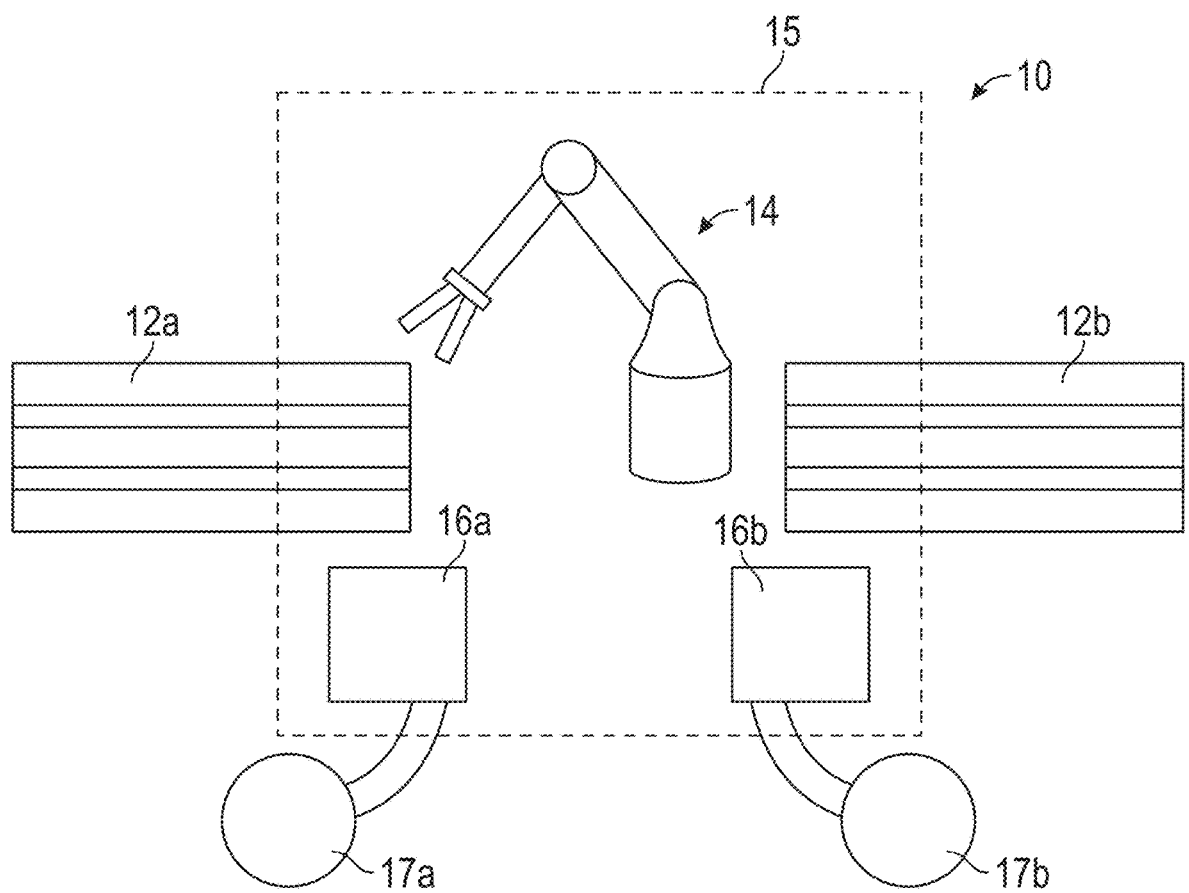
FIG. 1 is a schematic view of a cell with at least one clinching press according to the disclosed embodiments.

A fastener clinching system 10 is schematically illustrated in FIG. 1. First and second conveyors 12a, 12b feed different parts, such as stampings, into a robot 14 within a cell 15. The robot 14 transfers the parts from the conveyors 12a, 12b to clinching presses 16a, 16b (generally, clinching press 16). One clinching press 16a secures a fastener supplied by a vibratory feeder bowl 17a, and the other clinching press 16b secures nuts supplied by a vibratory feeder bowl 17b (generally, vibratory feeder bowl 17). The cell arrangement shown in FIG. 1 is exemplary only and may be configured differently than illustrated, for example, fewer or more operations, which may include different operations other than clinching.

Figure 2A:
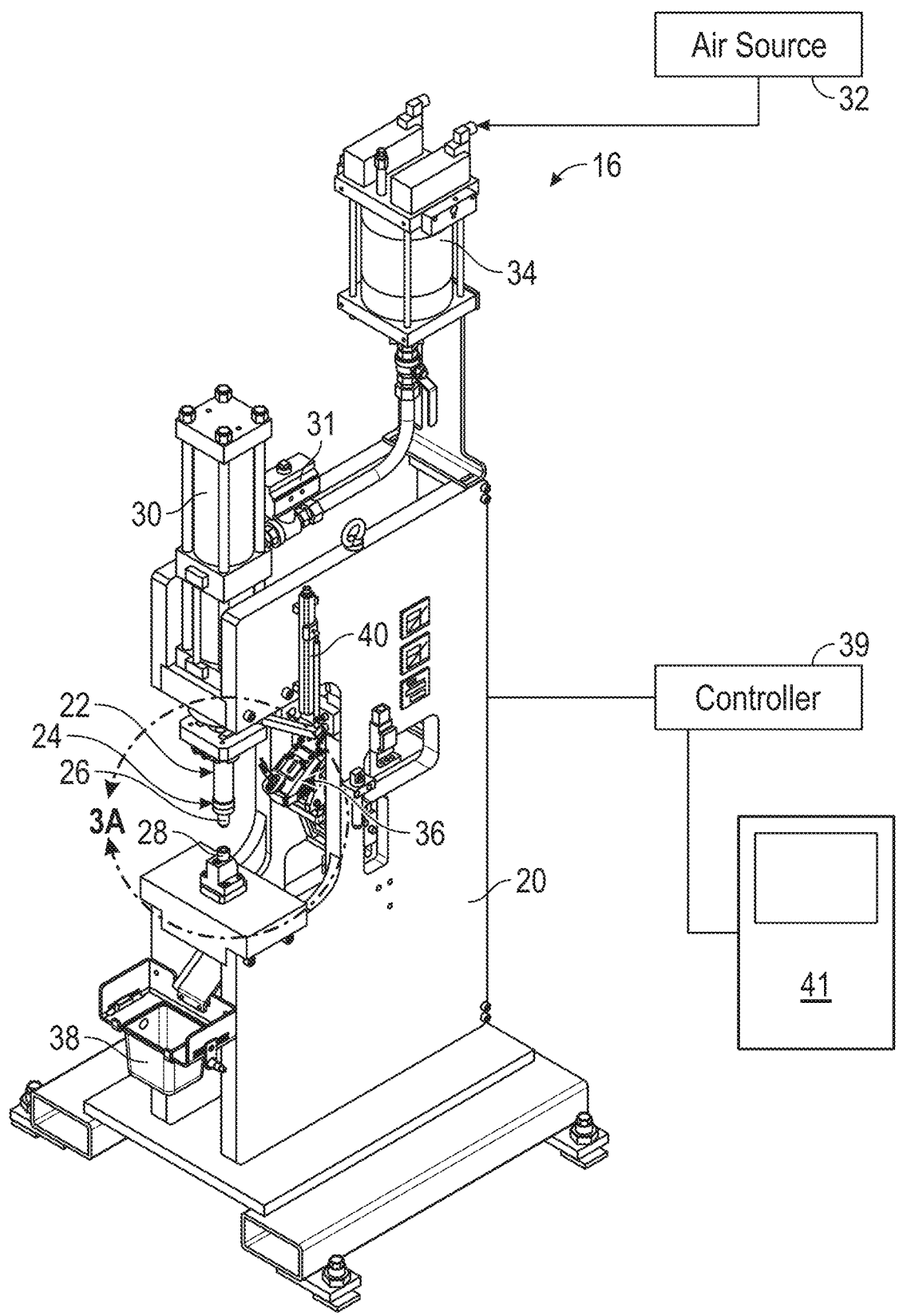
FIGS. 2A-2C are respectively perspective, front and side cross-sectional views of an example clinching press.
Figure 4:
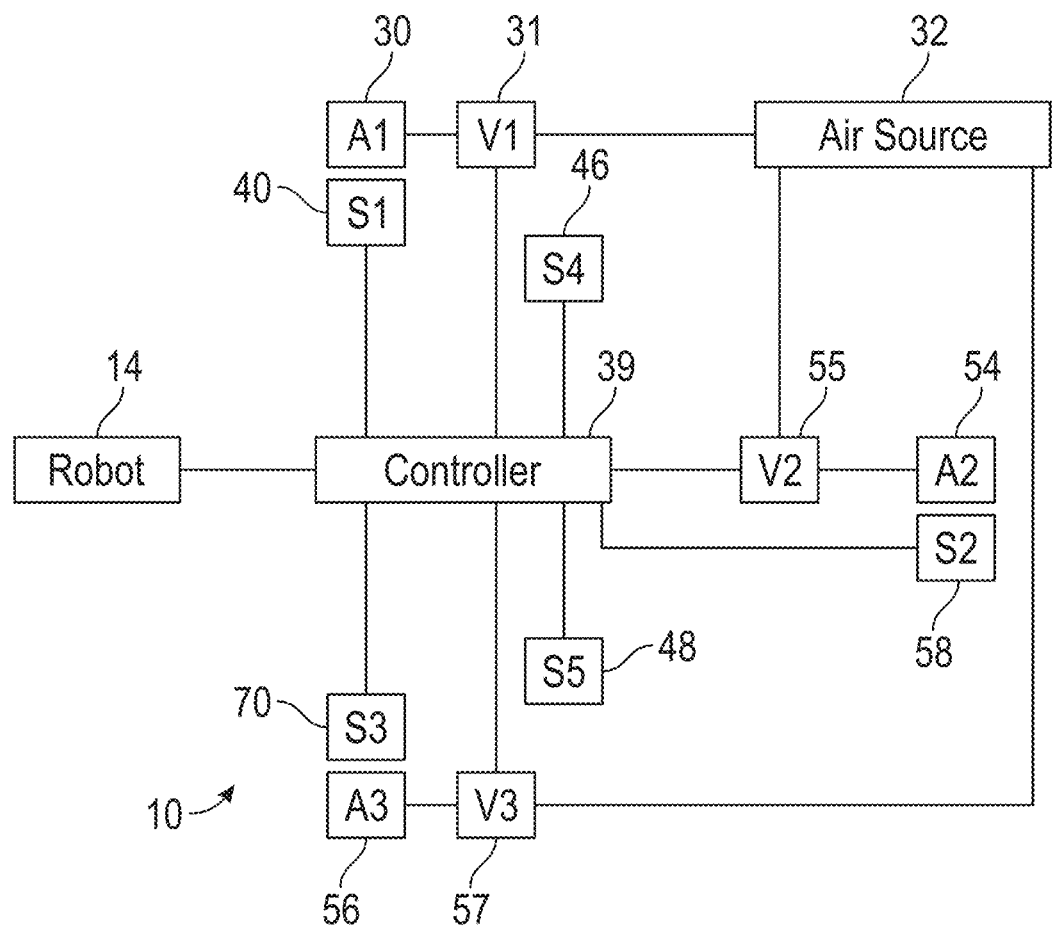
FIG. 4 is a controls schematic of the cell shown in FIG. 1.

Referring to FIG. 2A, a fastener clinching monitor 41 is connected to controller 39 in communication with various disclosed sensors (see, e.g, FIG. 4). The sensors track movements of components on the clinching press 16, which are associated with movement of the fastener throughout the clinching operation. The sensor data is used to determine useful information relating to the clinching operation, as will be appreciated from the description below. A monitor programming interface is connected to the fastener clinching monitor 41, and its data analyzed using, for example, statistical analysis software.

Figure 2B:
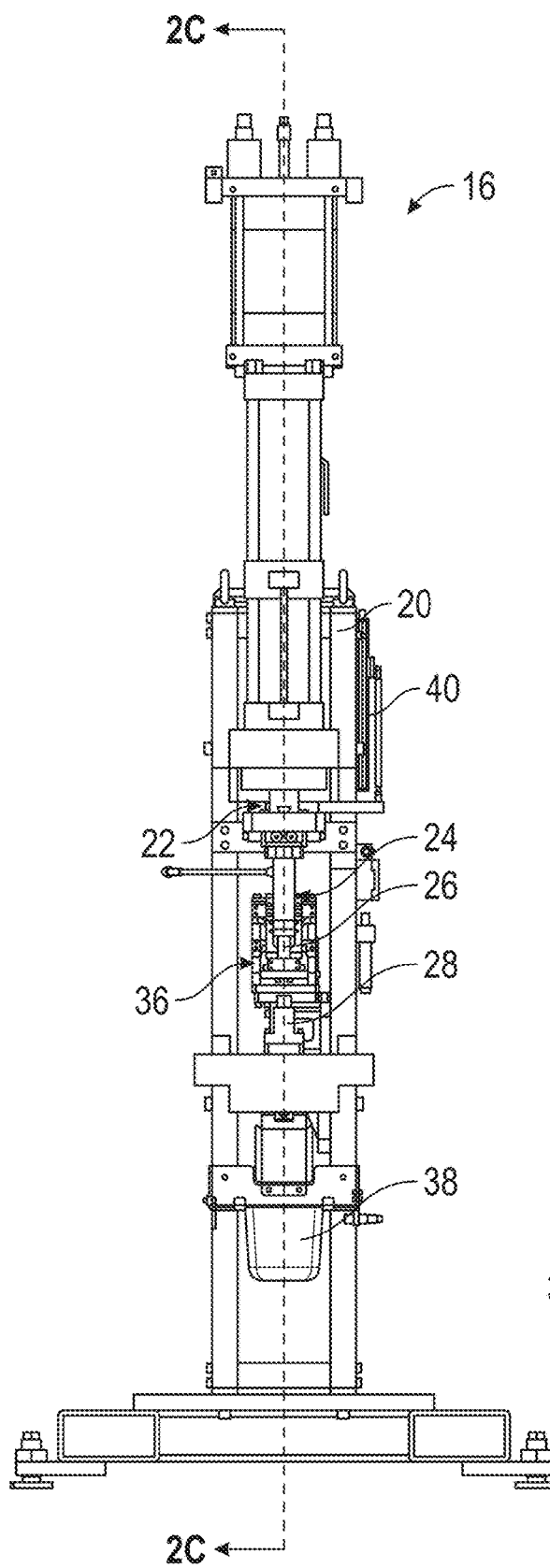
Figure 2C:
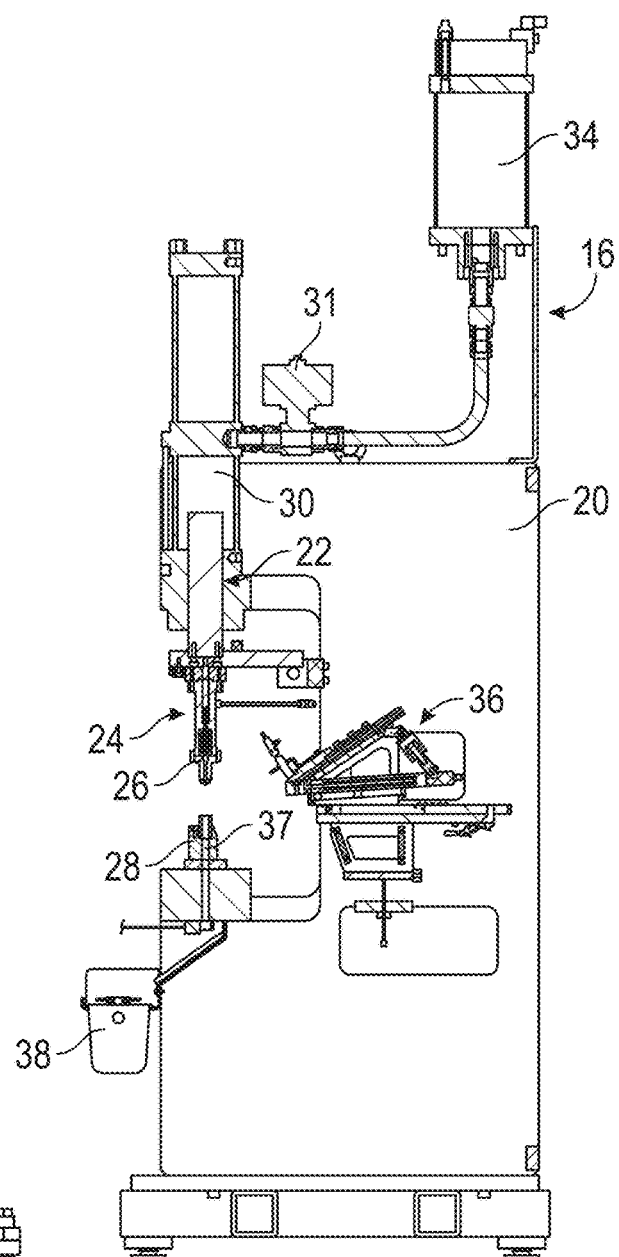
Figure 8A:
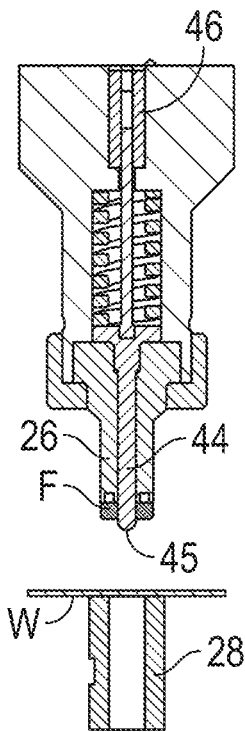
FIGS. 8A-8Q are cross-sectional views of the head assembly with respect to the die in various conditions that can be sensed by the disclosed sensor configuration.
Figure 8B:
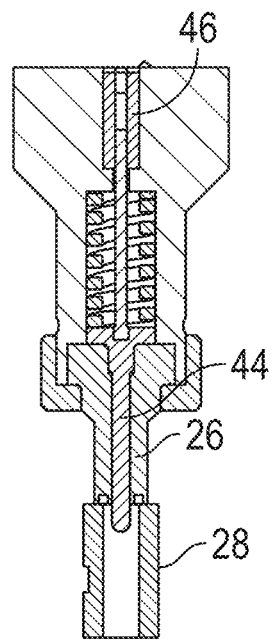
Figure 8C:
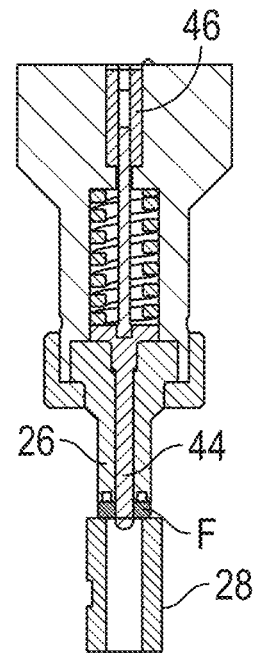
Figure 8D:
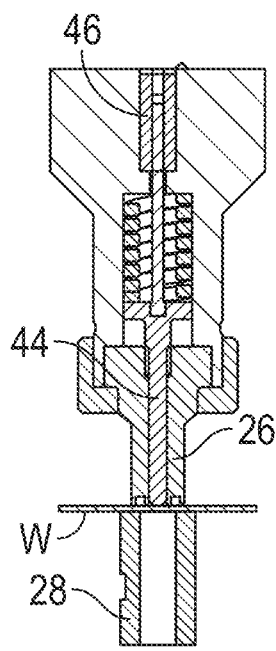
Figure 8E:
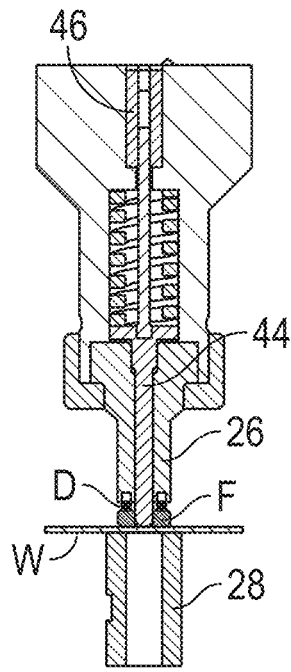
Figure 8F:
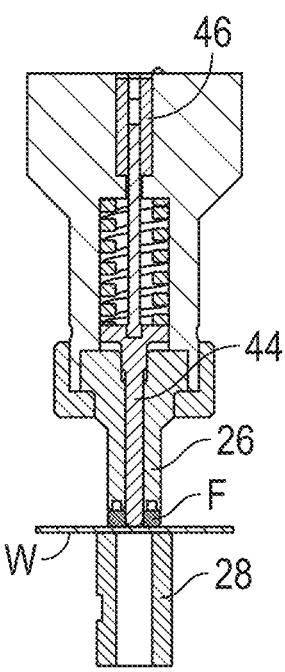
Figure 8G:
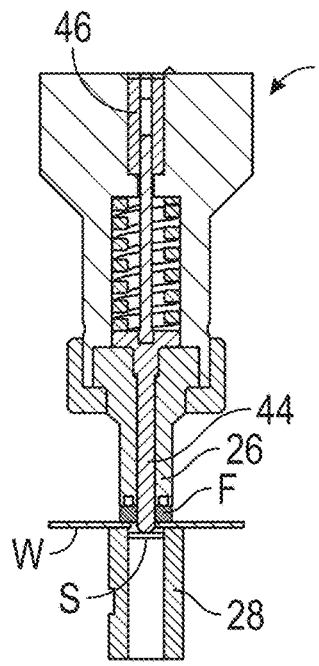
Figure 8H:
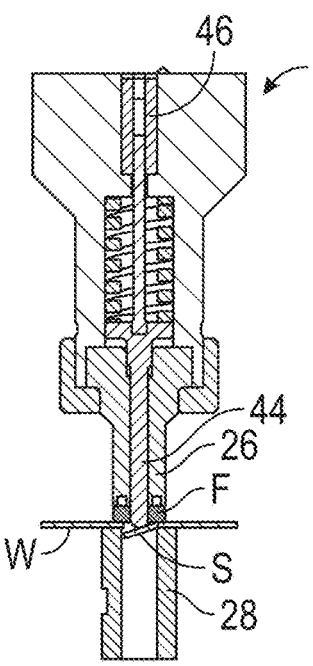
Figure 8I:
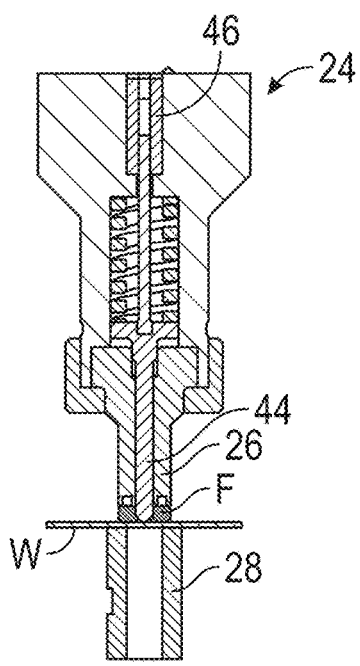
Figure 8J:
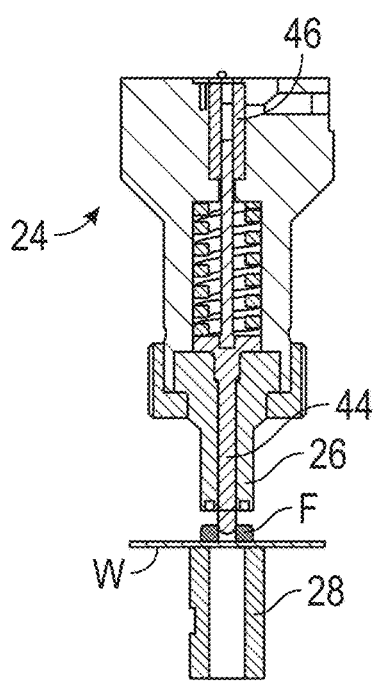
Figure 8K:
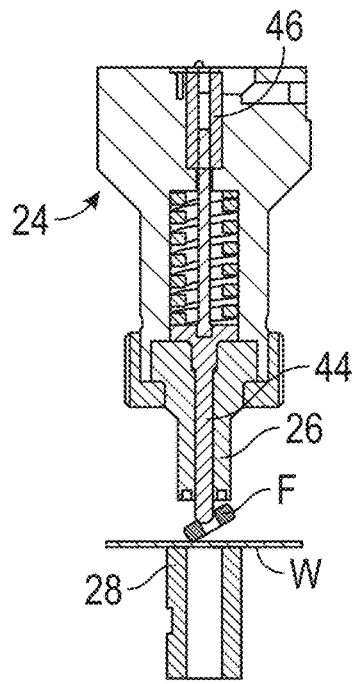
Figure 8L:
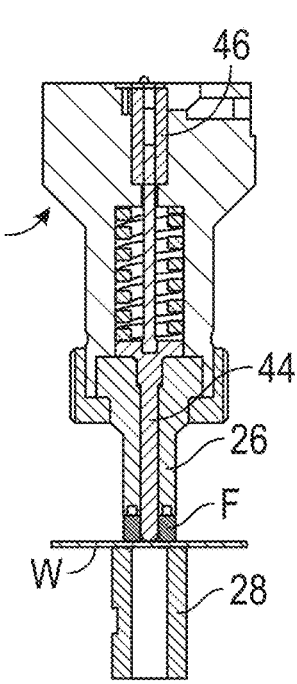
Figure 8M:
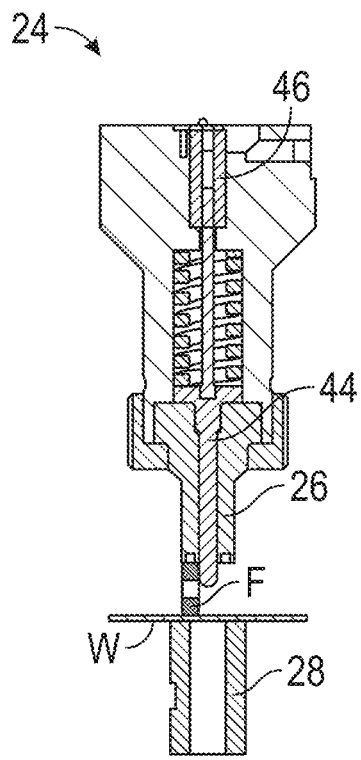
Figure 8N:
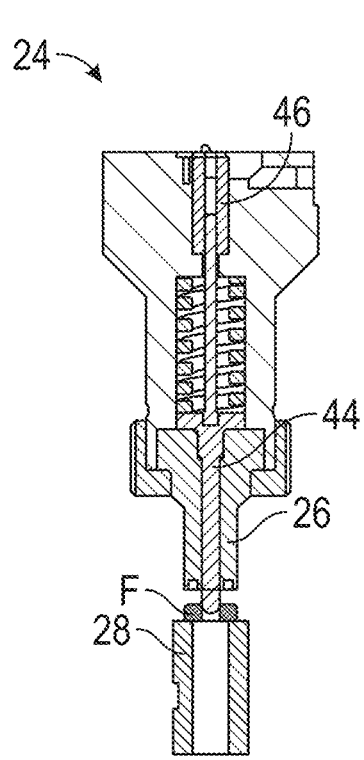
Figure 8O:
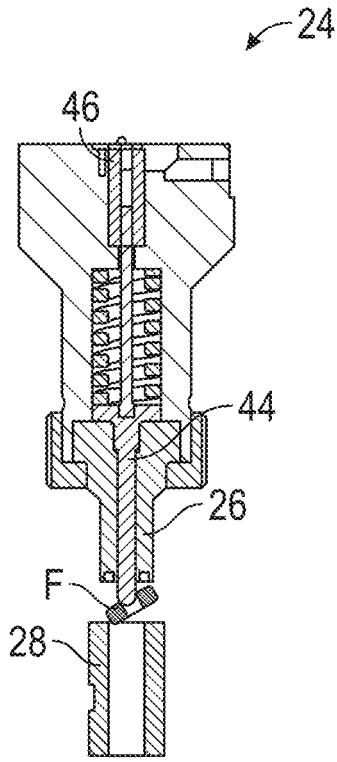
Figure 8P:
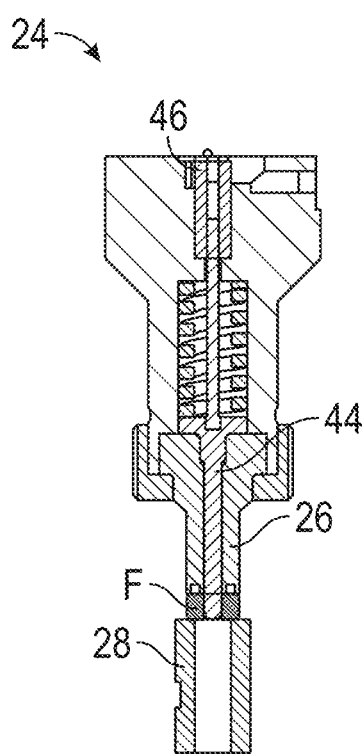
Figure 8Q:
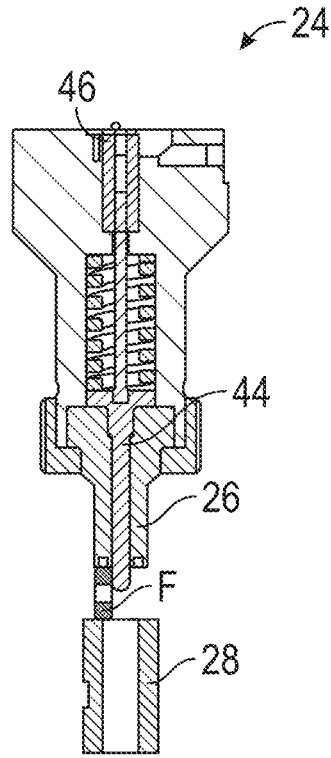

With reference to FIGS. 2A-2C, the clinching press 16 includes a frame 20 supporting a linearly moveable ram 22 that is used to force a fastener F into a workpiece W against a die 28 under high forces to clinch the fastener F onto the workpiece W, which is typically sheet metal. During the clinching operation, the fastener F pierces a hole into the workpiece W and produces a slug S, which is expelled (see, FIG. 8G). During piercing of the workpiece W with the fastener F, the slug S passes through a hole 37 in the die 28 and is collected in a basket 38. A slug sensor 48 may be used to detect the slug S as it travels through the hole 37, confirming the slug S has separated from the workpiece W.

A head assembly 24 is mounted onto an end of the ram 22, which is typically arranged above the die 28 supported on the frame 20. A head 26, which acts as an upper die, is provided by the head assembly 24 which engages and supports the fastener F. The fastener F is loaded onto the head 26 by a feeder 36 that receives properly oriented fasteners F from the vibratory feeder bowl 17. All of these operations occur at relatively high speed and must be performed with accuracy in a repeatable manner. Since there are many opportunities for error due to the complexity and speed of the fastener clinching operation, it is desirable to error-proof the system 10 as much as practically possible. However, past efforts for error prevention and monitoring have not been sufficient for a production environment.

In operation, the ram 22 is actuated by a cylinder 30 that is supplied compressed air from an air source 32 via an accumulator 34. The cylinder 30 may be an air-over-oil intensifying cylinder, for example. A control valve 31 selectively supplies air to the cylinder 30 to expand and retract the ram 22 in response to a command from the controller 39 (FIG. 4). A ram sensor 40, an a linear variable displacement transducer (LVDT), is typically mounted exteriorly to the frame 20 and connected to the outside of the head assembly 24 to monitor the travel of the ram 22. Traditionally, this ram sensor 40 has been used to provide all the monitoring as to whether a successful clinching operation has been performed or whether an error has occurred during the attempted clinching operation.

Figure 3A:
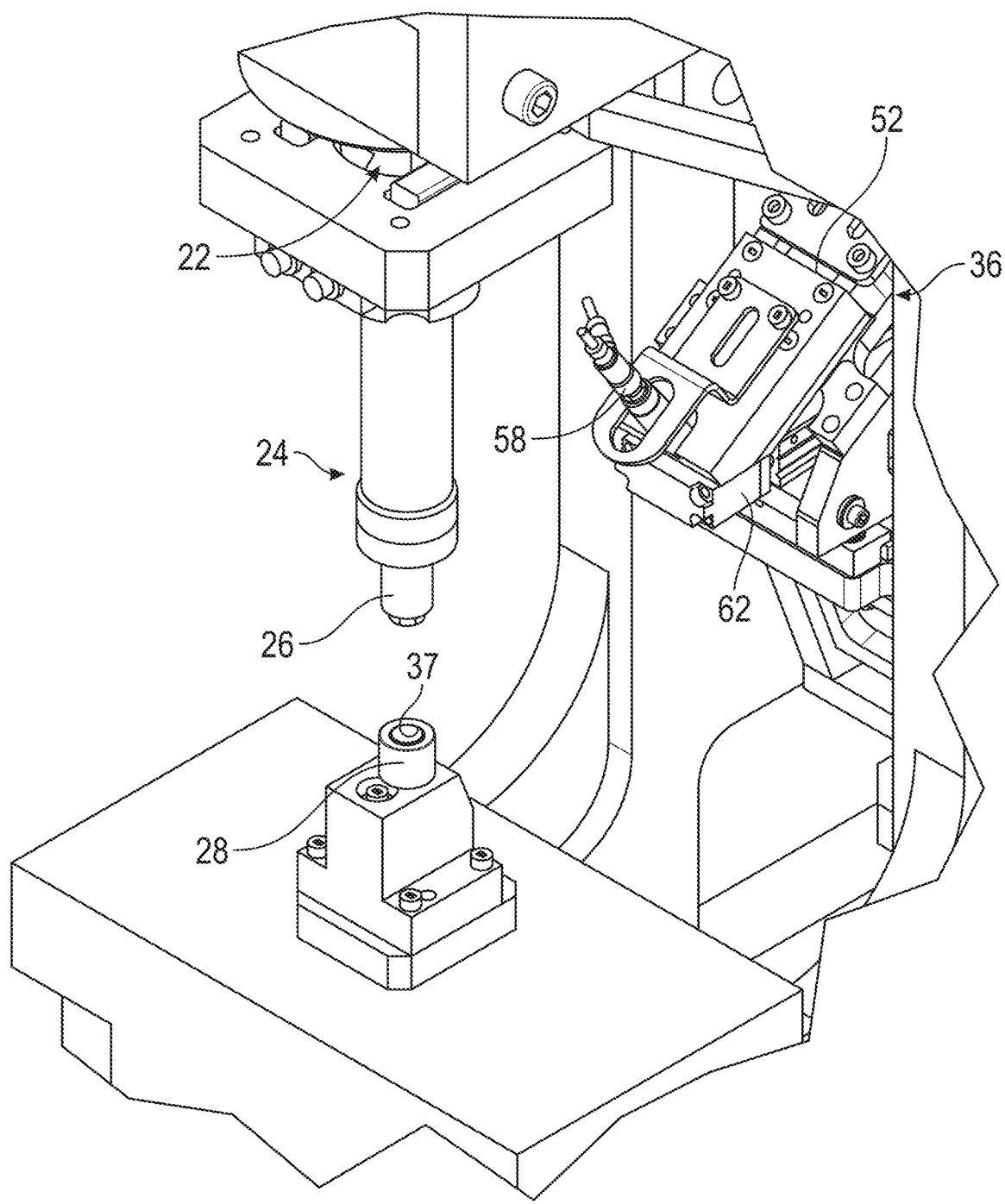
FIGS. 3A and 3B are perspective and enlarged cross-sectional views of a head assembly, die and fastener feeder.
Figure 3B:
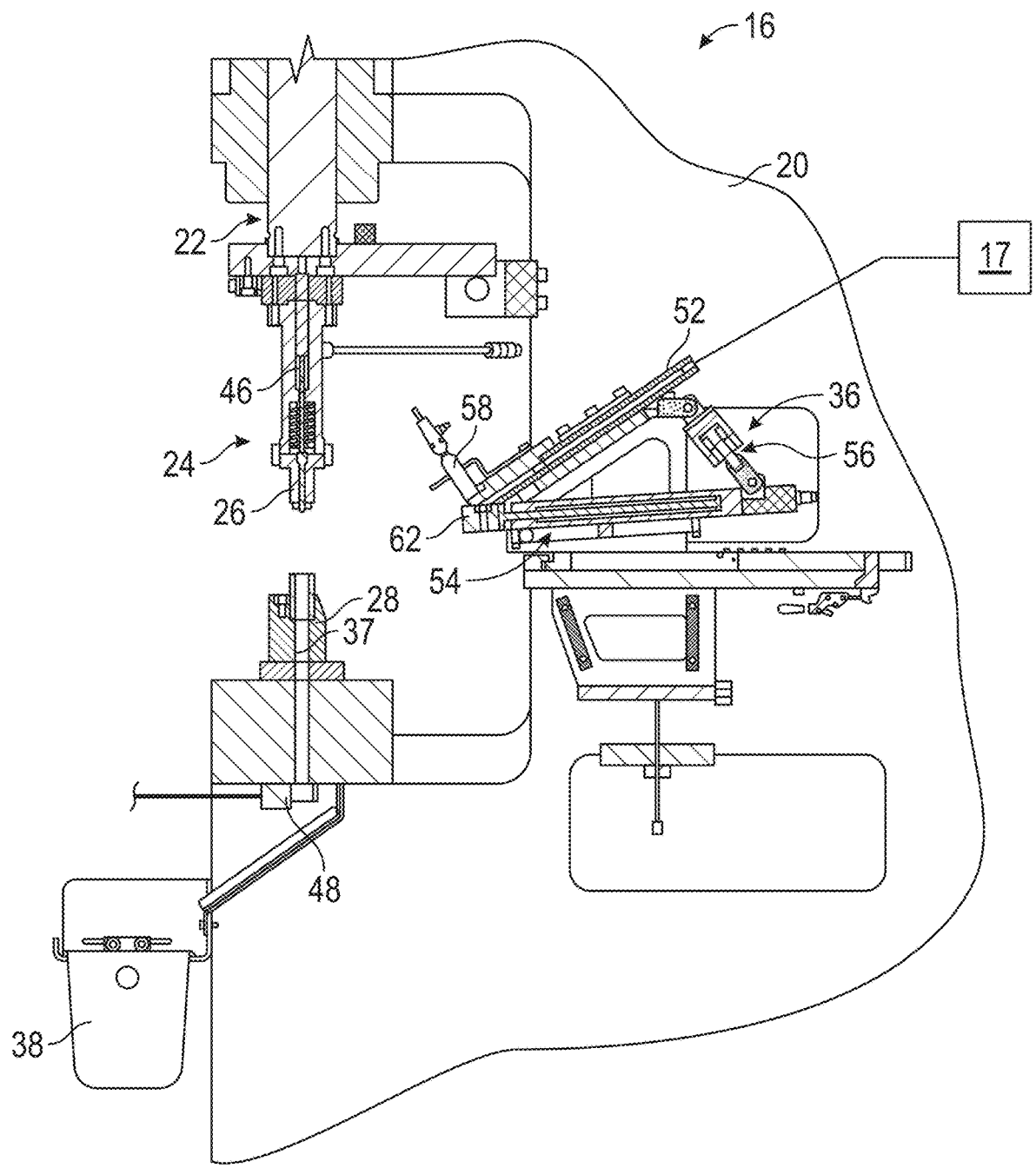

The feeder 36 is supplied fasteners F from the vibratory feeder bowl 17 and must deliver those fasteners F, one-by-one, to the head 26. The feeder 36 positions the fastener to be loaded onto the head 26 for subsequent engagement with the workpiece W. Referring to FIGS. 3A-3B, the feeder 36 is supported on a mount 50 secured to the frame 20. The feeder 36 includes a chute 52, which delivers fasteners from the vibratory feeder bowl 17 to an end 62 of a shuttle 60. The end 62 includes a pocket 64 (FIG. 5B) that receives a fastener F from the chute 52. A proximity sensor 58 may be provided relative to the feeder 36 to ensure that a fastener F has in fact been loaded properly into the pocket 64.

The feeder 36 includes a feed shuttle cylinder 54 pneumatically actuated by a valve 55, as shown in FIG. 4. The shuttle cylinder 54 moves the shuttle 60 between retracted positions (i.e., first position) shown in FIGS. 5A and 5B and extended positions shown in FIGS. 6A-6C. With the feeder 36 in the retracted position, a lift cylinder 56, operated by valve 57 (FIG. 4), is in a retracted position.

In one example, the head assembly 24 secures the head 26 to a body 66 using a nut 68 to facilitate assembly and disassembly for maintenance and replacement of wear parts. The head 26 may also be secured to the body 66 using bolts (not shown), if desired, instead of the large nut 68. A pin 44 (or "stripper pin") that extends to a tip 45 is slidably received within the head 26 such that the tip 45 extends out of the head 26 for supporting the fastener F on a face of the head 26 (FIG. 6B). A pin sensor 46 is arranged inside of the head assembly 24 and is coupled to the pin 44. In one example, the pin sensor 46 is a linear variable displacement transducer (LVDT) having a core 78 that is secured to a stop 74 provided on the pin. The stop 74 and the core 78 are arranged in a cavity 72 within the head assembly 24. A spring 76, such as a coil spring, is arranged within the cavity 72, circumscribing the core 78. The spring 76 urges the pin 44 to a normally fully extended position, which serves during normal operation to push the slug S through die 28 and into hole 37.

The pin 44 translates during operation in a unique manner based upon the fastener loaded onto the tip 45, the fastener's orientation and presence/absence, wear of press components, and the quality of the clinching operation (such as set-down travel measurement resulting in a clinch signature consisting of both travel distance and velocity).

An issue with a traditional LVDT sensor as the ram sensor 40 is its accuracy over the ram's long stroke as the LVDT sensor is not likely to have the resolution sufficient to detect fastener height and upset distances with high enough precision to discern fastener issues and to confirm the installation process reliability. The disclosed pin sensor 46 and associated pin 44 addresses this issue.

As will be appreciated, the described pin sensor 46 provides more accuracy over a much smaller pin stroke as compared to the ram stroke, which also enables the use of a simplified ram sensor 40. For example, a single position switch (e.g., limit switch) may be used as the ram sensor 40 to indicate the ram 22 has returned or that it is closed sufficiently to detect a pinch-point hazard condition. In one example, the ram sensor 40 is a high-precision sensor that engages the ram only within close proximity of the fastener installation position. The ram sensor 40 may be provided as part of a servo-electric actuator used as the cylinder 30, which can provide the ram positioning function without the need for a separate, discrete ram position sensor. If the ram sensor 40 is a simple switch(es), the controller 39 in many cases may consider travel time before decision making to determine if the ram 22 arrived at the ram sensor 40 in the expected time. The additional integrated pin sensor 46 works in cooperation with the ram sensor 40, which is a great improvement to accuracy and functionality. For example, high resolution data from both sensors 40, 46 facilitates identification of specific conditions to facilitate automated fault recovery and process verification and trend analysis, such as for preventative maintenance.

Figure 6A:
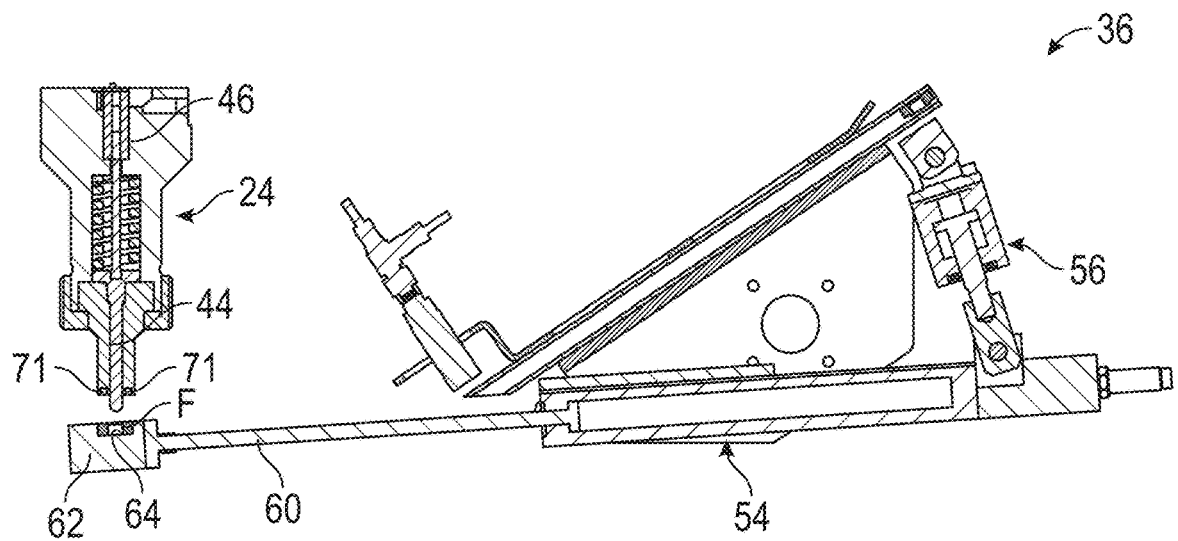
FIGS. 6A-6C are respectively cross-sectional views of the feeder in an extended position with respect to the head assembly in pre-loading, loading, and unloaded positions.
Figure 6B:
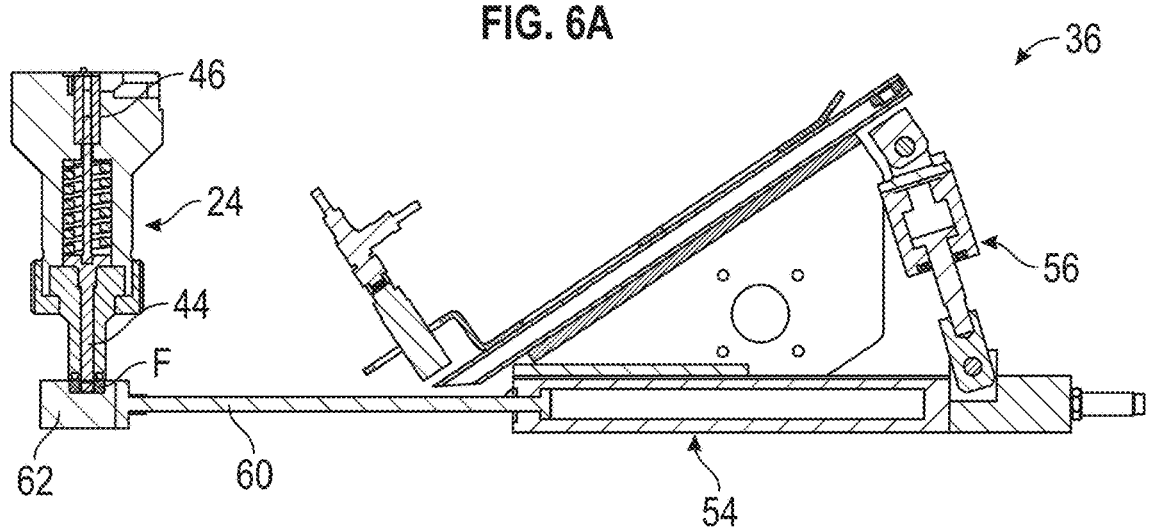
Figure 6C:
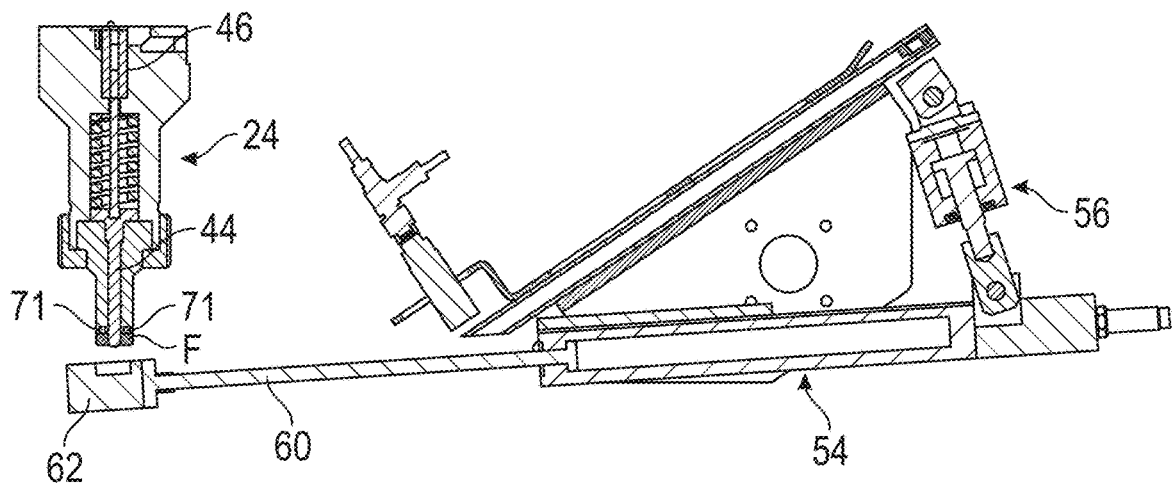

FIGS. 6A-6C illustrate a fastener head-loading sequence in which the fastener F is loaded onto the head 26 without losing engagement of the fastener F during its transfer, which reduces the frequency of misloaded fasteners. Once the ram 22 has been raised following the preceding clinching operation, the feeder 36 actuates the shuttle 60 to an extended position (i.e., second position, shown FIGS. 6A-6C) using the shuttle cylinder 54 to arrange the end 62 and its supported fastener F immediately beneath the head 26 in a "pre-load position." The lift cylinder 56 is actuated to extend and pivot the shuttle cylinder about a pivot 65 (FIG. 5A) to raise the end 62 and engage the fastener F with the head 26 in a "loaded position." The head 26 includes one or more magnets 71 (e.g., three or four discrete, circumferentially spaced magnets) that retain the fastener F against the head assembly 24 and centered with respect to the pin 44 as the lift cylinder 56 is retracted to move the end 62 downward to an "unloaded position."

FIGS. 7A and 7B illustrate example error conditions in which the fastener F is misloaded (FIG. 7A) or absent (FIG. 7B) relative to the head assembly 24. The sensor used to verify the feeder 36 has raised to deposit the fastener on the pin 44 is useful to detect a position fault. The sensor detecting the feeder has lifted to the correct position would trigger an error in the event the position cannot be achieved. Examples are when there is a misalignment between the feeder 36 and the pin 44, the fastener (e.g., nut) fails to fit over the pin 44, or the fastener has shifted into an unacceptable orientation during the transfer motion. These conditions may be detected by detecting a pressure anomaly within the lift cylinder 56 or detecting an angular position of the shuttle 60, for example. A proximity sensor 70 (FIG. 5B) may be incorporated internally to the head 26, if desired, to verify the fastener F has been loaded onto the head 26.

Once the fastener F has been loaded onto the head 26, the robot 14 positions the workpiece W between the fastener F and the die 28. The ram 22 then is lowered to engage the fastener F and the workpiece W between the head 26 and die 28 under low pressure. The pin position data is used to determine that the correct fastener and workpiece (stamping) is present—before a high value of installation force is applied. Assuming there are no sensed errors, the ram 22 continues to advance under high pressure until the fastener F pierces the workpiece W, producing a separate slug S. Once the fastener is installed, the pin pushes the slug S produced by the fastener into the die 28. This fully extended pin position is detected by the pin sensor 46 to determine that the slug S has indeed separated from the completed assembly. During clinching a position/force signature may be used to further validate the fastener and installation process.

A typical clinching press operation is complex and performed at relatively high speeds. Thus, it is desirable to detect when a successful clinching operation is performed as well as numerous error conditions that can occur. To this end, several disclosed sensors (e.g., ram sensor 40 and pin sensor 46) are incorporated into the clinching press 16 to monitor the clinching operation to greatly improve the overall accuracy and functionality of the clinching press 16. Other sensors (e.g., slug sensor 48, feeder proximity sensor 58 and/or head proximity sensor 70) may also be incorporated for further functionality and verification.

Measurement of the pin position enables high-resolution measurement of the process to detect a wide range of conditions as shown in Table 1, below, based upon a pin travel distance signature using the measured position of the pin 44 by the pin sensor 46. Information from other sensors may also be used to provide further data and increase error detection and monitoring functionality.

| Clinch Tool | Stripper Pin | Feeder | Condition Detected | Ram Position | Pin Position | Feeder Raised | FIG. |
|---|---|---|---|---|---|---|---|
| Returned | Fully extended | Lowered | Home position | X (ram returned switch is minimum) | X | Raised position detection would be a fault | 8A |
| Returned | Not fully extended (or depressed) | Lowered | Stripper pin motion fault - a collision (e.g., during workpiece loading); clinch tool loose; broken stripper spring | O | X | | 8A (with pin movement) |
| Returned | Not fully extended (or depressed) | Raised | 1. Incorrect fastener (hole too small for stripper pin or fastener too thin) 2. Incorrect fastener (too small) or feeder misaligned with stripper pin | O | X | X (raised position switch is minimum) | 7B (with pin movement) |
| Returned | Fully extended | Not fully raised | 1. Feeder misaligned 2. Fastener too thick 3. Contamination on punch face or fastener | O | X | X (raised position switch is minimum) | 7A |
| Advanced under low force | Fully extended | N/A | 1. No workpiece and fastener present 2. No workpiece present | O | X | | 8B, 8C |
| Advanced under low force | Depressed | N/A | No fastener present | O | X | | 8D |
| Advanced under low force | Not fully extended or depressed | N/A | Workpiece and fastener present | O (advanced time is minimum) | X | | 8E, 8F |
| Advanced under low force | Not fully extended or depressed | N/A | Workpiece present but fastener misaligned | O (advanced time is minimum) | X | | 8J, 8K, 8M |
| Advanced under low force | Not fully extended or depressed | N/A | No workpiece and fastener misaligned | O (advanced time is minimum) | X | | 8N, 8O, 8Q |

-continued

| Clinch Tool | Stripper Pin | Feeder | Condition Detected | Sensor Ram Position | Sensor Pin Position | Sensor Feeder Raised | FIG. |
|---|---|---|---|---|---|---|---|
| Advanced under low force | Depressed to fastener thickness position * | N/A | Fastener present | O (advanced time is minimum) | X | | 8F |
| Advanced under low force | Depressed to incorrect thickness position * | N/A | 1. Fastener upside-down 2. incorrect fastener thickness | O (advanced time is minimum) | X | | 8I, 8L, 8P |
| Advanced under clinching force | Depressed to desired thickness before partial extension * | N/A | Clinch successful and slug not detaching cleanly (Misaligned or worn die button; defective fastener) | O (switch to detect low pressure closed position is minimum) | X | | 8H |
| Advanced under clinching force | Fully extended | N/A | Clinch successful and slug clear | X (ram advanced switch is minimum) | X | | 8G |
| Advanced under clinching force | Fully depressed | N/A | no fastener present | X (ram advanced switch is minimum) | X | | 8D |

\* Stripper pin position sensing must be used in conjunction with upper ram stroke position sensing
X = Required; with minimum requirement shown in parenthesis
O = Optional; with minimum requirement shown in parenthesis Since the sensor is monitoring the pin 44 within the head 26, there is far greater accuracy than using external ram position switches or sensors that are not sufficiently sensitive to workpiece and fastener thickness variations and where the ram travel is increased by machine deflection. Since the pin sensor 46 is integrated within the clinching press 16, it is protected from damage and not accessible for tampering. Moreover, the increased accuracy provided by the pin sensor 46 enables a much more simplified ram sensor 40, as described.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A clinching press for performing a clinching operation to secure a fastener to a workpiece, the fastener clinching press comprising:

a frame supporting a die having a hole configured to cooperate with the fastener to produce a slug from the workpiece;
a ram having a head assembly configured to engage the fastener;
a first sensor configured to determine a ram position relative to the die;
a pin slidably supported within the head assembly and extending out of the head assembly to a tip that is configured to locate a fastener relative to the die, the pin movable between multiple pin positions including a slug-eject position;
a second sensor arranged in the head assembly and operatively connected to the pin, the second sensor configured to monitor the multiple pin positions relating to a pin travel distance signature; and
a controller in communication with the first and second sensors, the controller is configured to determine an outcome of the clinching operation based upon the ram position and the pin travel distance signature.

2. The clinching press of claim 1, wherein the head assembly includes a cavity, and the pin is slidably movable within the cavity and includes a stop, a spring arranged in the cavity and cooperating with the stop to bias the pin to a fully extended position.

3. The clinching press of claim 2, wherein the ram includes a hydraulic cylinder, the head assembly includes a head with a bore slidably receiving the pin, and a body operatively mounted to the hydraulic cylinder, and the head operatively secured to the body to enclose the cavity.

4. The clinching press of claim 2, wherein the second sensor is a linear variable displacement transducer having a core secured to the stop for determination of pin movement therewith.

5. The clinching press of claim 1, wherein the head assembly includes a magnet configured to maintain the fastener in engagement with the head assembly during the clinching operation.

6. The clinching press of claim 1, comprising a fastener feeder having a shuttle with an end configured to receive a fastener, the shuttle mounted to a shuttle cylinder configured to move the shuttle between a shuttle extended position and a shuttle retracted position, and a lift cylinder configured to pivot the shuttle cylinder between a first position configured to arranged the fastener in spaced relation to the head assembly and a second position configured to arrange the fastener in engagement with the head assembly.

7. The clinching press of claim 1, wherein the first sensor is a switch.

8. The clinching press of claim 1, comprising a fastener proximity sensor arranged in the head assembly at a face of the head assembly that is configured to support the fastener during the clinching operation.

9. The clinching press of claim 1, comprising a slug discharge sensor in communication with the hole, the slug discharge sensor in communication with the controller, the controller configured to detect a passage of the slug with the slug discharge sensor.

10. An assembly cell including the clinching press of claim 1, the assembly cell comprising a multi-axis robot configured to transfer the workpiece to and from the clinching press for the clinching operation.

11. The assembly cell of claim 10, comprising a conveyor configured to feed the workpiece to the multi-axis robot.

* * * * *